ANDRE HUET
INVENTOR.

Patented Mar. 2, 1954

2,670,972

UNITED STATES PATENT OFFICE 2,670,972

TUBE AND HEADER JOINT

André Huet, Paris, France, assignor to Combustion Engineering, Inc., New York, N. Y., a corporation of Delaware Application May 24, 1949, Serial No. 94,947

1 Claim. (Cl. 285—163)

The present invention relates to a joint for detachably connecting the tubes or elements of a heat exchanger to the headers of said exchanger, the type of connection being of such design that it is fluid tight even in case of variations of temperature and in cases where high pressure joints are required.

In heat exchangers such as water reheaters or economizers where the fluid that flows inside the tubes of the exchanger is water, the various portions of the joint between the tube and the header do not cool or heat up with the same rapidity since the coefficient of heat transmission between water and metal is very great. As a result of this, the surfaces in contact at the joint may occasionally be separated from each other, particularly when the water within the tube is under high pressure, and this causes leakage, erosion and rapid destruction of the joint.

In order to overcome these disadvantages, I have designed a joint for connecting tubes to headers that forms the object of the present invention. According to this, the end of the tube that is to be detachably connected to the header is machined so as to form a male or female conical set-off, and a corresponding female or male conical set-off is provided in the header. On all or part of the conical set-off surfaces, both of the tube and the header, there are provided little circular grooves which give a saw-tooth appearance to the surface of the set-offs when seen in section. Between the two male and female set-offs there is fitted a gasket of plastic or elastic metal of conical shape and suitably having an angle at the top slightly different from that of the two conical set-offs. Upon being tightened, the two conical set-offs engage in each other, locking and crushing the metalloplastic gasket between them. This insures a tight joint, even though the surfaces of the conical set-offs might momentarily come apart under the effect of variations of temperature.

Figure 1:
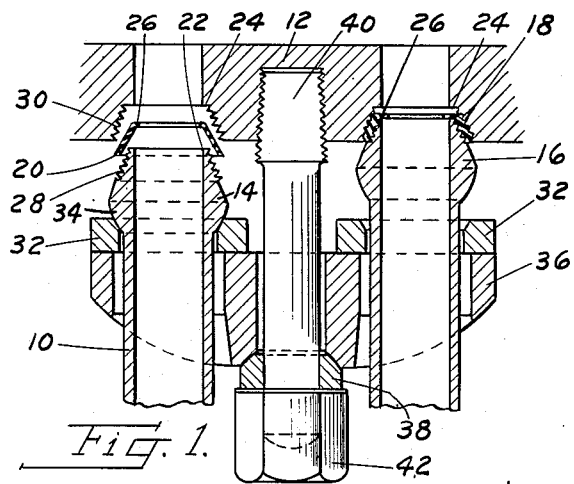

The method of carrying out the invention will be readily understood from the following description when read with reference to the appended drawings:

Figure 1 is a view in section of the various members that form the joint between a tube and header according to the invention.

Figure 2:
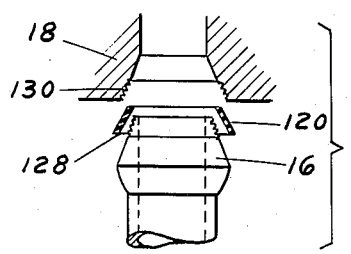
Figure 3:
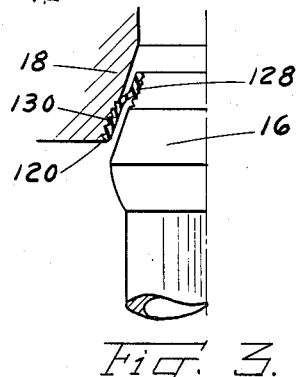

Figures 2 and 3 relate to a variant of the joint, Figure 2 showing the parts that form the joint before assembly, and Figure 3 showing on a larger scale the positions of the parts when differences of expansion may produce a certain amount of play (shown exaggerated in the drawing) between the male and female portions.

Figure 4:
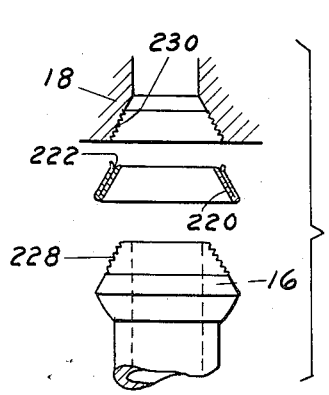
Figure 5:
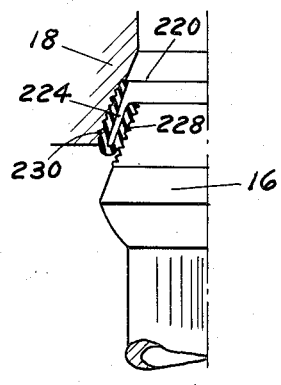

Figures 4 and 5 relate to another embodiment of the joint using a gasket bent in U shape, Figure 4 showing the parts that form the joint before assembly and Figure 5 showing on an enlarged scale the respective positions of the various elements when there might be play resulting from differences of expansion.

According to the invention, the tube or element 10 of the exchanger to be joined to the wall of the header 12 is provided with an upset or enlarged end 14 having its end shaped as a male cone frustum 16. A corresponding female conical seat 18 is provided in the wall of header 12. Between these two conical parts there is fitted a gasket 20, e. g. metalloplastic of annealed copper, said gasket being of general truncated cone shape, and having an angle at the top slightly different from, e. g. greater than, the angle at the top of cone frustums 16 and 18.

Furthermore, an annular seat 22 is provided at the end of cone 16, and circular plane seat 24 is similarly provided at the bottom of the female portion 18. The gasket 20 has a terminal circular collar flange 26 which applies against the seat 22 of the male portion 16. According to the invention, part or all of the truncated cone-shaped surfaces 16 and 18 are provided with little protuberances obtained, for example, by making circular grooves 28, 30 in the walls of the two cone frustums which then, in sections, have a toothed shape, as shown in the drawing.

For locking of the joint, a washer 32 applies against a set-off 34, e. g. spherical, provided at the base of the male portion 16. The washer 32 of two adjacent tubes may apply against the heads 16 of the elements in order to effect locking of the joints, this being done through the intermediary of a flange or rider 36, as shown in Figure 1. This flange 36 is locked against washer 32 by means of a ring 38 transversed by a stud 40 secured in header 12. A nut 42 mounted on the end of the stud 40 impinges against washer 38 which applies the common flange 36 against the washers 32, thus insuring engagement of the male cones 16 in the female seats 18, and at the same time locking the copper gasket 20 between the conical surfaces.

When the locking has been effected, the corrugations provided on the cone frustums 16 and 18 strongly squeeze between them the copper gasket 20 which penetrates into these corrugations and insures tightness. Even when fully locked there is still a certain play between the annular flange 26 of the copper gasket 20 and the countersunk seat 24 of the female portion, as shown at the right in Figure 1, so that the pressure of the internal fluid acts on gasket 20 to apply it against the male portion.

When an abrupt variation of temperature causes the two conical seats to move apart from each other, the intermediate gasket 20 becomes deformed, but still continues to adhere to the male and female portions, thanks to the circular serrations provided on the said portions. The tightness is thus retained until equilibrium has again been restored, with the two conical portions returning to their normal positions and the intermediate joint resuming its shape and usual position.

In the variant shown in Figures 2 and 3, the gasket 120 is of purely truncated cone shape without collar flange, and grooves 128 are provided only in the upper part of cone 16 at a height of about half the height of cone frustum gasket 120. The female portion 18 is provided with grooves 130 at a height of at least half the height of cone frustum gasket 120. The assembling of this joint is effected in the same manner as in the preceding case, and the members take up the positions shown in which gasket 120 is compressed between the set-offs 16 and 18.

When variations of temperature cause the occurrence of play between the two male and female portions, this play being shown exaggerated in Figure 3 for the sake of clarity, it can be seen that owing to the grooves 130, the bottom portion of gasket 120 continues to adhere to the female set-off 18, while the top portion of the same gasket continues to adhere to the male set-off 16 thanks to the top grooves 128. The gasket 120 then assumes the shape shown in the drawing, thus insuring tightness in spite of the space formed between the seats 16 and 18.

In order to facilitate the working of the joint, the angle at the top of cone frustum gasket 129 is slightly greater than the angle at the top of cone frustums 16 and 18. It is of course evident that use may be made of a cone frustum gasket 120 having an angle at the top smaller than the angle at the top of cone frustums 16 and 18, but in this case the arrangement of the grooves 128 and 130 on the seats 16 and 18 would be reversed, i. e. the base of cone frustum gasket 120 would adhere to the male set-off 16, and its top portion to the female set-off 18.

Figures 4 and 5 illustrate a variant in which this gasket 220 is of truncated cone shape but consists of a sheet of metal bent in U form. The grooves 228 and 230 respectively provided on the seats 16, 18 occupy a height corresponding to the entire height of cone frustum gasket 220. The end of gasket 220 that is directed toward the inside of the header is suitably beveled as shown at 222, so as to facilitate the flow of the liquid within the U-shaped channel 224 of the gasket between the two metal layers of which it is formed whenever expansions cause a spreading apart. Figure 5 shows on an enlarged scale the position of the members when the male seat 16 happens to move away from the female seat 18. In this case, the U gasket 220 continues to adhere owing to the serrations 228, 230 on the conical set-offs, but it opens slightly as shown in the drawing, this action being facilitated by the effect of the pressure of the fluid which penetrates into the channel 224 in the gasket as a result of the beveling of the top edges of said joint.

It is obvious that modifications of details may be made in the illustrated embodiments of the invention without departing from its scope.

What I claim is:

A joint for connecting a tube to the header of a heat exchanger comprising; frusto-conical seats formed on the end of the tube and the recess that serves for fitting said tube into the header; circular grooves or serrations on the tube near its distal end and along approximately a half of the height of the frusto-conical seat; circular grooves or serrations on the outer end of the recess, and along approximately a half of the height of the frusto-conical seat; and a gasket, preferably of metalloplastic material, adapted to be squeezed between the end of the tube and the recess in the header to make a joint, so that, notwithstanding expansions, one half of the gasket continues to adhere to the tube end, and the other half of the gasket to the wall of the recess.

ANDRÉ HUET.

References Cited in the file of this patent

UNITED STATES PATENTS

| Number | Name | Date |
| --- | --- | --- |
| 1,789,594 | Oven | Jan. 20, 1931 |
| 1,914,512 | Key | June 20, 1933 |
| 1,926,107 | Morehead | Sept. 12, 1933 |
| 2,407,552 | Hoesel | Sept. 10, 1946 |
| 2,407,553 | Hoesel | Sept. 10, 1946 |
| 2,429,924 | Clarke | Oct. 28, 1947 |

FOREIGN PATENTS

| Number | Country | Date |
| --- | --- | --- |
| 20,635 | France | July 13, 1918 |